H. A. MULVANY.
ELECTRIC HEATING SYSTEM AND THERMOSTATIC CONTROL.
APPLICATION FILED JUNE 1, 1915.

1,186,024.  Patented June 6, 1916.

WITNESSES:
Charles Rokles
Thos Eastberg

INVENTOR
Harry A. Mulvany
By Strong & Townsend
ATTORNEYS

UNITED STATES PATENT OFFICE.

HARRY A. MULVANY, OF BERKELEY, CALIFORNIA.

ELECTRIC HEATING SYSTEM AND THERMOSTATIC CONTROL.

1,186,024.  Specification of Letters Patent.  Patented June 6, 1916.

Application filed June 1, 1915. Serial No. 31,420.

*To all whom it may concern:*

Be it known that I, HARRY A. MULVANY, a citizen of the United States, residing at Berkeley, in the county of Alameda and State of California, have invented new and useful Improvements in Electric Heating Systems and Thermostatic Control, of which the following is a specification.

This invention relates to an electric heating system and thermostatic control therefor.

One of the objects of the present invention is to provide a new, simple, effective electric heating system for bacteriological incubators, chicken incubators, paraffin ovens, and like devices, where a constant, even temperature is required.

Another object of the invention is to provide in said system a plurality of heating units, each unit consisting of a primary and a secondary section, and to connect the primary section of each unit with a source of current supply controlled by a master thermostat and the secondary section in each unit with the same source of current supply, but interposing a thermostat between each secondary section and source of current supply, thus providing means for independently controlling the current flow through the secondary section of each unit in the system.

Further objects will hereinafter appear. The invention consists of the parts and the construction and combination of parts as hereinafter more fully described and claimed, having reference to the accompanying drawings, in which—

Figure 1:
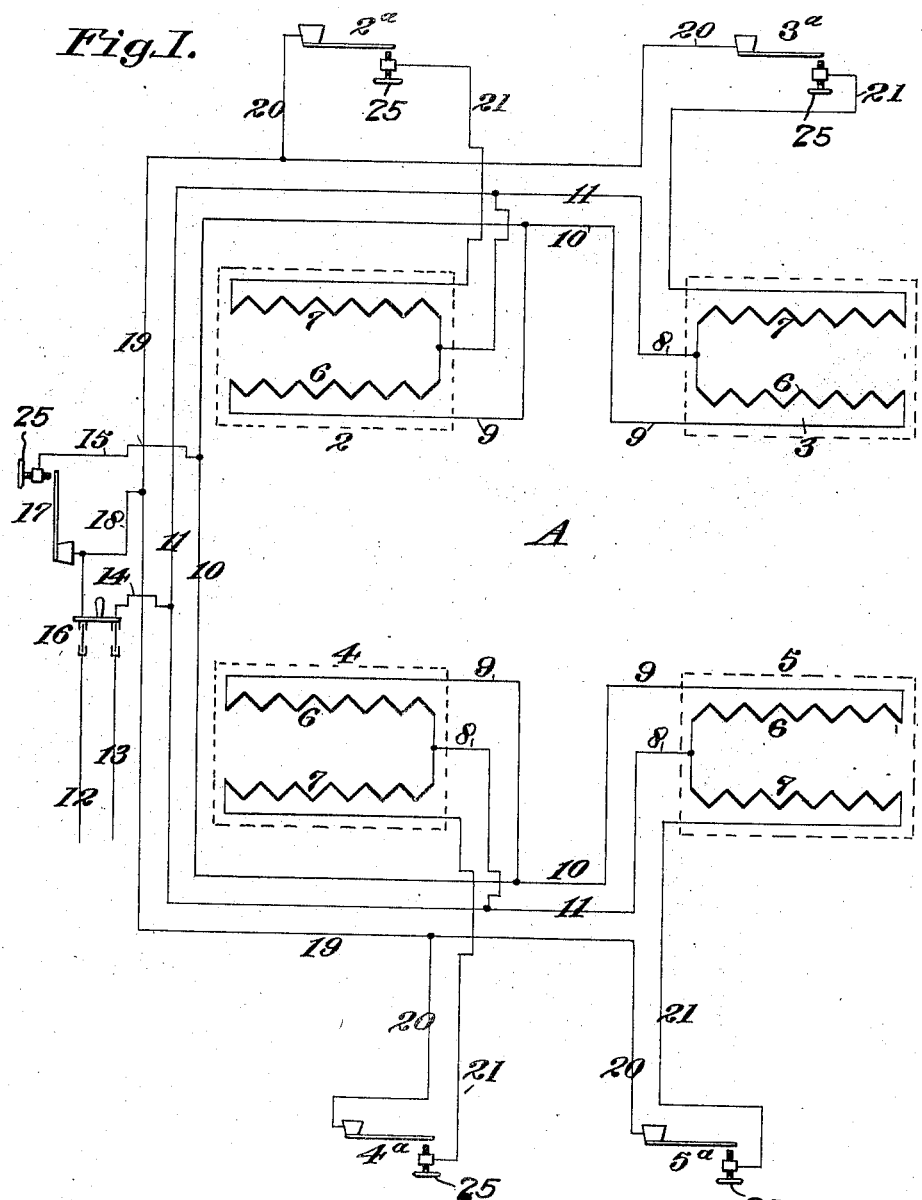
Figure 2:
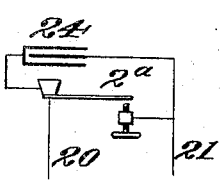

Figure 1 is a diagrammatic view of the heating system. Fig. 2 is a modification of one of the thermostat switches.

More particularly described, A indicates an electric heating system in which are connected four heating units 2, 3, 4 and 5. Each unit is in this instance constructed in two sections 6 and 7, or, in other words, provided with two independent coils which will hereinafter be termed the "primary" and "secondary" coils. The terminals of each primary coil are connected by wires 8 and 9 with common feed and return wires 10 and 11 respectively, and these wires are in turn connected with a source of current supply through wires 12 and 13.

Interposed between the main feed wires 12 and 13 and wires 10 and 11, and connected therewith by wires 14 and 15, is a knife switch 16 and a master controlling thermostatic switch 17, the function of which will be later described. Connected with the main feed wire 12, through a wire 18, is a second common feed wire 19 which supplies current to the secondary coil of each heating unit. Interposed between wire 19 and each secondary coil is a thermostatic switch, one for each unit, such as indicated at $2^a$, $3^a$, $4^a$ and $5^a$; one terminal of each thermostatic switch being connected by a wire 20 with the common feed wire 19 and the other terminal by a wire 21 with the negative terminal of each secondary coil.

In operation, with the several heating units installed in an incubator or like device, the flow of current from the source of supply will, under normal conditions, only pass through the primary coil of each heating unit; the master controlling thermostatic switch 17 being set half a degree centigrade higher than the secondary coil controlling thermostatic switches, this being permitted as each thermostatic switch is provided with an adjustable contact in the form of a screw 25.

The current flow through the primary coils can be traced as follows: Current entering the main positve feed wire 12 passes through one leg of the knife switch 16. It then passes through wire 18 which is connected with one terminal of the thermostatic switch 17 and then passes through the thermostatic switch wire 15 and wire 10. The current then passes through wire 9 which is connected to the primary coil of the heater indicated at 2 then out through the opposite terminal and wire 8 back to the return wire 11 which is connected by a wire 14 with the other leg of the knife switch 16. The current similarly passes through the primary coil of each heating unit as the terminals of each primary coil are connected with the wires 10 and 11. A parallel feed circuit controlled by the master thermostatic switch 17 is thus provided by which the primary coil in each heating unit is supplied with current. The primary coil in each heating units supplies sufficient heat to maintain the required temperature during normal atmospheric conditions. If the external temperature becomes lowered to such a degree as to lower or reduce the temperature within the incubator, one or more of the secondary coil controlling thermostats will immediately close a circuit through one or more of the secondary coils with which each heating unit is provided. The temperature within the incubator or other device within which the heating system is installed will thus automatically be maintained at a fixed degree, as one or more secondary coils are automatically connected by the other connected thermostatic switches.

The current flow through one of the secondary coils can be traced as follows: Current supplied by the positive wire 12 passes through one leg of the knife switch 16, wires 18 and 19, then through wire 20, through a secondary thermostatic switch $2^a$, wire 21, secondary coil 7, and then out through wires 8, 11 and 14 which are connected with the other leg of knife switch 16 and the negative wire connected therewith; this circuit being the same in all the heating units employed.

From the foregoing description it will be seen that the master controlling thermostatic switch 17, with connected primary coils 6, supply all the heat necessary to maintain a fixed temperature during normal atmospheric conditions, and that any additional heat required for maintaining said temperature is automatically controlled by the secondary thermostatic switches provided (one for each unit). The current consumption is thus economically employed and the temperature positively controlled as one or more thermostats may get out of order without affecting the remaining units.

Referring to Fig. 2, it will be seen that the condenser 24 has been connected between the terminals of the thermostatic switch. This is only provided for the purpose of preventing any arcing tendency between the contacts where a direct current of considerable voltage is employed. This condenser is, however, not necessary when the system is operated by alternating current.

A heater constructed and arranged as here shown is particularly useful and efficient where bacteriological incubating rooms of considerable cubic capacity are employed. As the heating units may be placed at various points around the room it is possible to maintain a positive and even temperature throughout the room. Provision of the several thermostats practically eliminates the possibility of the temperature falling or rising above or below a fixed or predetermined degree as the failure of one thermostat does not interfere with the operation of the others. The proper spacing of the heating units, furthermore, permits a large volume to be heated at an even temperature. The provision of the several heating units also eliminates a high temperature at one point, thus reducing fire hazard and also reducing cost of operation and installation.

While four heating units have been employed and shown in the present instance, it is obvious that any number of same may be employed according to the work required.

The materials and finish of the several parts of the mechanism may be such as the experience and judgment of the manufacturer may dictate.

I wish it understood that various changes in form, proportions and minor details of construction may be resorted to within the scope of the appended claims and that I do not want to limit myself to the specific design and construction here shown.

Having thus described my invention, what I claim and desire to secure by Letters Patent is—

1. An electric heater comprising a plurality of heating units, a primary and a secondary coil in each unit, a primary feed wire connected with one terminal of each primary coil, a return wire connected with the other terminal of each of said coils, a thermostatic switch controlling the current flow through said wires and connected primary coils, a secondary feed wire connected with one terminal of each secondary coil, a wire connecting the other terminal with the return wire, and a thermostatic switch interposed between the secondary feed wire and each secondary coil.

2. An electric heater comprising a plurality of heating units, a primary and a secondary coil in each unit, a primary feed wire connected with one terminal of each primary coil, a return wire connected with the other terminal of each of said coils, a thermostatic switch controlling the current flow through said wires and connected primary coils, a secondary feed wire connected with one terminal of each secondary coil, a wire connecting the other terminal with the return wire, a thermostatic switch interposed between the secondary feed wire and each secondary coil, and means for independently adjusting the position of the contact terminal on each thermostatic switch.

3. In a heater of the character described, a plurality of heating units, a primary and a secondary coil in each unit, means for controlling the current flow through the primary coils, and independent means controlling the current flow through each secondary coil.

4. In a heater of the character described, a plurality of heating units, a primary and a secondary coil in each unit, a master thermostatic switch controlling the current flow through the primary coils, and thermostatic switches, one for each heating unit, controlling the current flow through the secondary coils.

In testimony whereof I have hereunto set my hand in the presence of two subscribing witnesses.

HARRY A. MULVANY.

Witnesses:
C. H. G. RUNDE,
ALVIN REHMKE.